(No Model.)

J. P. BURNHAM.
EXPANSION OR TELESCOPIC JOINT FOR PIPES CONTAINING FLUID UNDER PRESSURE.

No. 571,337. Patented Nov. 17, 1896.

WITNESSES:

INVENTOR:
JOHN P. BURNHAM
BY Munday, Evarts & Adcock,
HIS ATTORNEYS.

UNITED STATES PATENT OFFICE.

JOHN P. BURNHAM, OF CHICAGO, ILLINOIS.

EXPANSION OR TELESCOPIC JOINT FOR PIPES CONTAINING FLUID UNDER PRESSURE.

SPECIFICATION forming part of Letters Patent No. 571,337, dated November 17, 1896.

Application filed January 6, 1896. Serial No. 574,513. (No model.)

*To all whom it may concern:*

Be it known that I, JOHN P. BURNHAM, a citizen of the United States, residing in Chicago, in the county of Cook and State of Illinois, have invented a new and useful Improvement in Expansion or Telescopic Joints for Steam or other Pipes containing Fluids under Pressure, of which the following is a specification.

My invention relates to improvements in expansion or telescopic joints for steam or other pipes containing fluids under pressure.

The object of my invention is to provide a self-balanced expansion or telescopic joint which will operate efficiently to prevent injurious strains upon the pipe or upon the parts to which the different sections of the pipe are secured, and which at the same time will be durable and simple in construction and capable of being cheaply manufactured.

To this end my invention consists in providing between the two sections of the pipe, which are connected together telescopically, a chamber of less pressure than the steam or other fluid in the interior of the pipe, such chamber being preferably in open communication with the outer air, and the same being preferably substantially equal in area in cross-section to the pipe, the walls of the chamber being in part connected to or formed integrally with one section of the pipe and in part connected or formed integrally with the other section of the pipe, so that the pressure of the steam against the walls of this intermediate chamber in opposite directions will thus neutralize the pressure of the steam in opposite directions against the two opposite ends of the pipe, and thereby relieve the two sections of any strain or pressure tending to separate or force them asunder.

Figure 1:
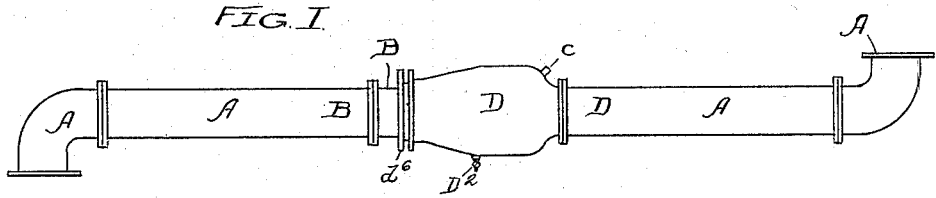
Figure 2:
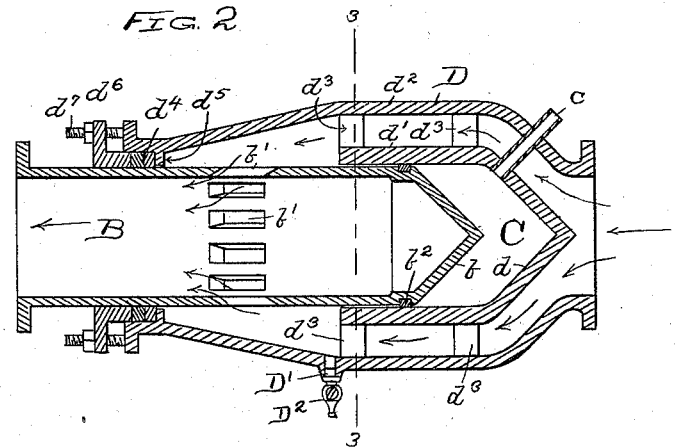
Figure 3:
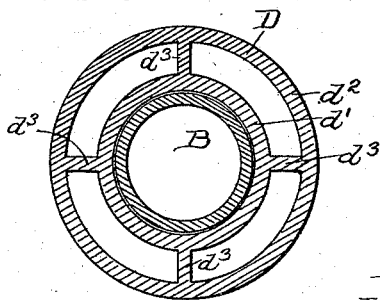

In the accompanying drawings, which form a part of this specification, and in which similar letters of reference indicate like parts in all the views, Figure 1 is a side elevation of a steam or other pipe furnished with my invention; Fig. 2 is an enlarged vertical section, and Fig. 3 is a cross-section on the line 3 3 of Fig. 2.

In the drawings, B D are two sections of a steam or other pipe A, which are jointed together by a telescopic or expansion joint, so that one section may telescope or slide in respect to the other. C is a chamber interposed between the two sections B D, its opposite walls $b$ $d$ being the one, $b$, connected to or formed integral with the pipe-section B, and the other, $d$, being connected to or formed integral with the other pipe-section D. This chamber C should be substantially equal in area in cross-section to the cross-sectional area of the pipe A. The air or fluid in this chamber C is under less pressure than the steam or other fluid in the pipe A, and the chamber is preferably in open communication with the outer air through a pipe or passage $c$, with which it is provided for this purpose.

The pipe-section D is furnished with double walls $d'$ $d^2$, connected together by spiders $d^3$, the interior wall $d'$ telescoping on and fitting the exterior of the pipe B, and its outer wall $d^2$ being enlarged into a bell to form the annular throat or passage of the pipe which communicates with the interior of the pipe E through the openings $b'$ therein. The wall $d$ of the chamber C is preferably made conical or tapering, so as to offer less obstruction to the passage of the steam through the pipe A. A packing-ring $b^2$ is inserted between the inner wall $d'$ of the section D and the pipe B to form a substantially tight joint and prevent the escape of steam into the chamber C, and the pipe-section D is also provided with a gland or packed joint, comprising the packing-rings $d^4$, the shoulder $d^5$ on the interior of the section D, the clamp-ring $d^6$, and the adjusting-screws $d^7$.

The bell or enlargement in the pipe-section D is, or should be, furnished with an outlet or drain pipe D', provided with a valve D² for closing it, so that any water of condensation may collect in this lower portion of the pipe formed by the swell or enlargement and be drawn off.

In operation the end-thrust or steam-pressure against the outer ends or elbows of the two sections of the pipe B D A, tending to separate or force them asunder, is compensated for by the steam-pressure against the two opposite walls $b$ $d$, which walls are connected with the two sections B D, so that no strain will be put upon the pipe by the pressure of the steam or fluid in the pipe tending to separate the telescopic joint, or, in other words, the two sections of the pipe connected by the telescopic joint are substantially balanced in respect to the pressure of the steam or other fluid in the pipe, while at the same time the sections are free to telescope in respect to each other to compensate for expansion or contraction or other movements, such, for example, as displacement or shifting of the parts to which the sections of the pipe are connected, as frequently occurs, especially in the mounting of steam-pipes on shipboard.

I claim—

1. The expansible or telescope joint for steam or other pipes, comprising in combination two telescopic sections or members furnished with a chamber between the same, the two opposite walls of such chamber being one connected to or formed integrally with one of said sections, and the other being connected to or formed integrally with the other of said sections, the pressure in such chamber being less than that in the pipe so that the pressure in the pipe against the two opposite walls of such chamber will compensate for the pressure in the pipe tending to separate the sections thereof, one of said pipe-sections having double walls with an annular passage between them surrounding said chamber for the passage of the steam or fluid from one pipe-section to the other substantially as specified.

2. The expansible or telescope joint for steam or other pipes, comprising in combination two telescopic sections or members furnished with a chamber between the same, the two opposite walls of such chamber being one connected to or formed integrally with one of said sections, and the other being connected to or formed integrally with the other of said sections, the pressure in such chamber being less than that in the pipe so that the pressure in the pipe against the two opposite walls of such chamber will compensate for the pressure in the pipe tending to separate the sections thereof, one of the sections of said pipe being provided with a pipe or passage connecting said chamber with the outer air, one of said pipe-sections having double walls with an annular passage between them surrounding said chamber for the passage of the steam or fluid from one pipe-section to the other substantially as specified.

3. The expansible or telescope joint for steam or other pipes, comprising in combination two telescopic sections or members furnished with a chamber between the same, the two opposite walls of such chamber being one connected to or formed integrally with one of said sections, and the other being connected to or formed integrally with the other of said sections, the pressure in such chamber being less than that in the pipe so that the pressure in the pipe against the two opposite walls of such chamber will compensate for the pressure in the pipe tending to separate the sections thereof, one of the sections of said pipe having a swell or enlargement to form an annular throat or communication around said chamber, and a drain pipe or opening at said bell or enlargement, substantially as specified.

4. The expansible telescope joint for steam or other pipes, comprising in combination a pipe-section B furnished with openings $b'$, and an end wall $b$, and a pipe-section D furnished with an inner wall $d'$ provided with an end wall $d$, and an outer enlarged wall or bell $d^2$ there being a chamber C between said end walls $b\ d$, substantially as specified.

5. The expansible or telescope joint for steam or other pipes, comprising in combination a pipe-section B furnished with openings $b'$, and an end wall $b$, and a pipe-section furnished with an inner wall $d'$ provided with an end wall $d$, and an outer enlarged wall or bell $d^2$, there being a chamber C between said end walls $b\ d$, and a pipe or passage $c$ connecting said chamber C with the outer air, substantially as specified.

6. The expansible or telescope joint for steam or other pipes, comprising in combination a pipe-section B furnished with openings $b'$, and an end wall $b$, and a pipe-section D furnished with an inner wall $d'$ provided with an end wall $d$, and an outer enlarged wall or bell $d^2$, there being a chamber C between said end walls $b\ d$, and a drain $D^2$, substantially as specified.

7. The expansion or telescopic joint for steam or other pipes, comprising in combination two telescopic sections or members furnished with a chamber between the same, the two opposite walls of such chamber being, the one connected to or formed integrally with one of said sections and the other connected to or formed integrally with the other of said sections, a packing-ring joint between said chamber and one of said pipe-sections, and a stuffing-box joint between said two telescopic pipe-sections, and a pipe or passage connecting such chamber with the outer air, substantially as specified.

8. The balanced expansion-joint for pipes, comprising an enlargement on one pipe into which the other pipe telescopes, said enlargement being provided with an interior inclosed chamber communicating with the outer air by a pipe or conduit for leading off the leakage, a stuffing-box between the enlargement and the entering-pipe, and a packing-ring between the chamber and said entering-pipe, substantially as specified.

JOHN P. BURNHAM.

Witnesses:
EDMUND ADCOCK,
H. M. MUNDAY.